US007370209B2

(12) United States Patent
Gaither et al.

(10) Patent No.: US 7,370,209 B2
(45) Date of Patent: May 6, 2008

(54) SYSTEMS AND METHODS FOR INCREASING THE DIFFICULTY OF DATA SNIFFING

(75) Inventors: Blaine Douglas Gaither, Fort Collins, CO (US); Bret Alan McKee, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 855 days.

(21) Appl. No.: 10/354,759

(22) Filed: Jan. 30, 2003

(65) Prior Publication Data

US 2004/0153660 A1 Aug. 5, 2004

(51) Int. Cl.
*H04K 1/00* (2006.01)
*H04L 9/00* (2006.01)

(52) U.S. Cl. .......................... 713/184; 713/190; 726/22
(58) Field of Classification Search .................. 726/22, 726/23, 30; 713/190, 184
See application file for complete search history.

(56) References Cited

U.S. PATENT DOCUMENTS

| | | | | | |
|---|---|---|---|---|---|
| 4,479,112 A | * | 10/1984 | Hirsch | .......................... | 380/52 |
| 4,941,668 A | * | 7/1990 | Mobrem | ..................... | 273/248 |
| 4,962,530 A | * | 10/1990 | Cairns | ........................ | 713/183 |
| 5,008,847 A | * | 4/1991 | Lapeyre | ...................... | 708/146 |
| 5,428,349 A | * | 6/1995 | Baker | ......................... | 340/5.54 |
| 5,559,961 A | * | 9/1996 | Blonder | ........................ | 726/18 |
| 5,596,718 A | * | 1/1997 | Boebert et al. | ............... | 726/16 |
| 5,748,888 A | * | 5/1998 | Angelo et al. | ................ | 726/26 |
| 6,141,751 A | * | 10/2000 | Ogawa | ........................ | 713/170 |
| 6,209,102 B1 | * | 3/2001 | Hoover | ......................... | 726/18 |
| 6,253,328 B1 | * | 6/2001 | Smith, Jr. | ..................... | 726/18 |
| 6,549,194 B1 | * | 4/2003 | McIntyre et al. | ........... | 345/173 |
| 2002/0144158 A1 | * | 10/2002 | Hekimian | ................... | 713/202 |
| 2004/0006709 A1 | * | 1/2004 | Chen | .......................... | 713/201 |
| 2004/0066422 A1 | * | 4/2004 | Chandane | ................... | 345/865 |
| 2004/0073809 A1 | * | 4/2004 | Wing Keong | ............... | 713/201 |
| 2004/0080529 A1 | * | 4/2004 | Wojcik | ........................ | 345/738 |
| 2004/0123160 A1 | * | 6/2004 | Mizrah | ........................ | 713/202 |

OTHER PUBLICATIONS

Bensinger, David, "Human Memory and the Graphical Password", 1998 Passlogix, Inc.*
Jermyn et al, "The Design and Analysis of Graphical Passwords", Submission to the 8th USENIX Security Symposium, Mar. 8, 1999.*
Enigma machine. (Jan. 24, 2007). In Wikipedia, The Free Encyclopedia., Feb. 1, 2007, from <http://en.wikipedia.org/w/index.php?title=Enigma_machine&oldid=102812525>pp. 1-18.*

* cited by examiner

*Primary Examiner*—Kambiz Zand
*Assistant Examiner*—William S Powers

(57) ABSTRACT

Disclosed are systems and methods for increasing the difficulty of data sniffing. In one embodiment, a system and a method pertain to presenting information to a user via an output device, the information corresponding to characters available for identification as part of sensitive information to be entered by the user, receiving from the user via an input device identification of information other than the explicit sensitive information, the received information being indicative of the sensitive information, such that the sensitive information cannot be captured directly from the user identification through data sniffing, and interpreting the identified information to determine the sensitive information.

12 Claims, 6 Drawing Sheets

SYSTEMS AND METHODS FOR INCREASING THE DIFFICULTY OF DATA SNIFFING

BACKGROUND

"Sniffing" is a term that is used in the computer arts to describe the process of monitoring data that has been entered into a computer or a computer system (e.g., network). Although the term can be used to describe legitimate monitoring of data for the purposes of management of a computer or computer system, more often the term is applied to processes used by unauthorized persons, e.g., hackers, to steal information.

One common form of such sniffing is keyboard sniffing. Keyboard sniffing involves recording information that is entered into a computer using a keyboard. Through keyboard sniffing, information such as usernames, passwords, personal identification numbers (PINs), social security numbers, credit card numbers, and the like may be captured and used for illicit or improper purposes. Currently, keyboard sniffing may be classified as either external sniffing or internal sniffing. In external keyboard sniffing, hardware is used to capture entered data. For instance, a recording device is either placed inside the user's keyboard or positioned so as to intercept data that is sent from the keyboard to the computer (e.g., between the keyboard cord and the computer receptacle). In internal sniffing, software is used to capture the entered information. For example, the driver software used to recognize selections entered by the user on his or her keyboard is modified or replaced so that each keystroke is identified and stored (e.g. on the computer's hard disk). Such a modification or replacement can be effected by unleashing a virus on the user's computer.

In either keyboard sniffing scenario, the data captured through the sniffing process is collected by the unauthorized person and the desired information extracted therefrom. Although it may be difficult to identify the pieces of information that are sought (e.g., username and password) from the captured data, it is by no means impossible given that most users enter relatively little information via the keyboard. Moreover, various software applications can be created to identify the desired information.

One problem with keyboard sniffing is that it is difficult to prevent. The reason for this is that the information is obtained as it is entered by the user with the input device (i.e., keyboard), not during data transmission (e.g., to another computer). Therefore, not even the most sophisticated encryption technologies are effective at preventing keyboard sniffing. Furthermore, keyboard sniffing is difficult to detect. Where external keyboard sniffing is used, the user may never realize that a sniffing device was connected to his or her keyboard. Due to recent advances in memory technologies, a large amount of data can be stored within a very small sniffing device. Accordingly, the unauthorized person may be able to connect the sniffing device to the keyboard, collect information over the course of a few days or weeks, and then retrieve the device to identify the desired information.

Where internal keyboard sniffing is used, the amount of data that is stored within the user's computer is relatively small in the typical situation, given that most users do not enter that much information via the keyboard. Therefore, as long as the modified or replaced keyboard driver performs the function of the original, the user may never become aware that the sniffing is occurring.

SUMMARY

Disclosed are systems and methods for increasing the difficulty of data sniffing. In one embodiment, a system and a method pertain to presenting information to a user via an output device, the information corresponding to characters available for identification as part of sensitive information to be entered by the user, receiving from the user via an input device identification of information other than the explicit sensitive information, the received information being indicative of the sensitive information, such that the sensitive information cannot be captured directly from the user identification through data sniffing, and interpreting the identified information to determine the sensitive information.

BRIEF DESCRIPTION OF THE DRAWINGS

The systems and methods disclosed herein can be better understood with reference to the following drawings. The components in the drawings are not necessarily to scale.

DETAILED DESCRIPTION

As noted above, keyboard sniffing is both difficult to prevent and difficult to detect. As is discussed in the following, however, keyboard sniffing can be made more difficult for the unauthorized person by using an output device, such as a computer monitor, to provide information to the legitimate user so that the user can convey sensitive information to the computer, for instance with a keyboard or other user input device, without literally entering the information with the keyboard.

Disclosed are systems and methods that increase the difficulty of keyboard sniffing and data sniffing in general. To facilitate description of the systems and methods, example systems are first discussed with reference to the figures. Although these systems are described in detail, these systems are provided for purposes of illustration only and various modifications are feasible. Examples of operation of the systems are provided to explain the manners in which data sniffing can be made more difficult.

Figure 1:
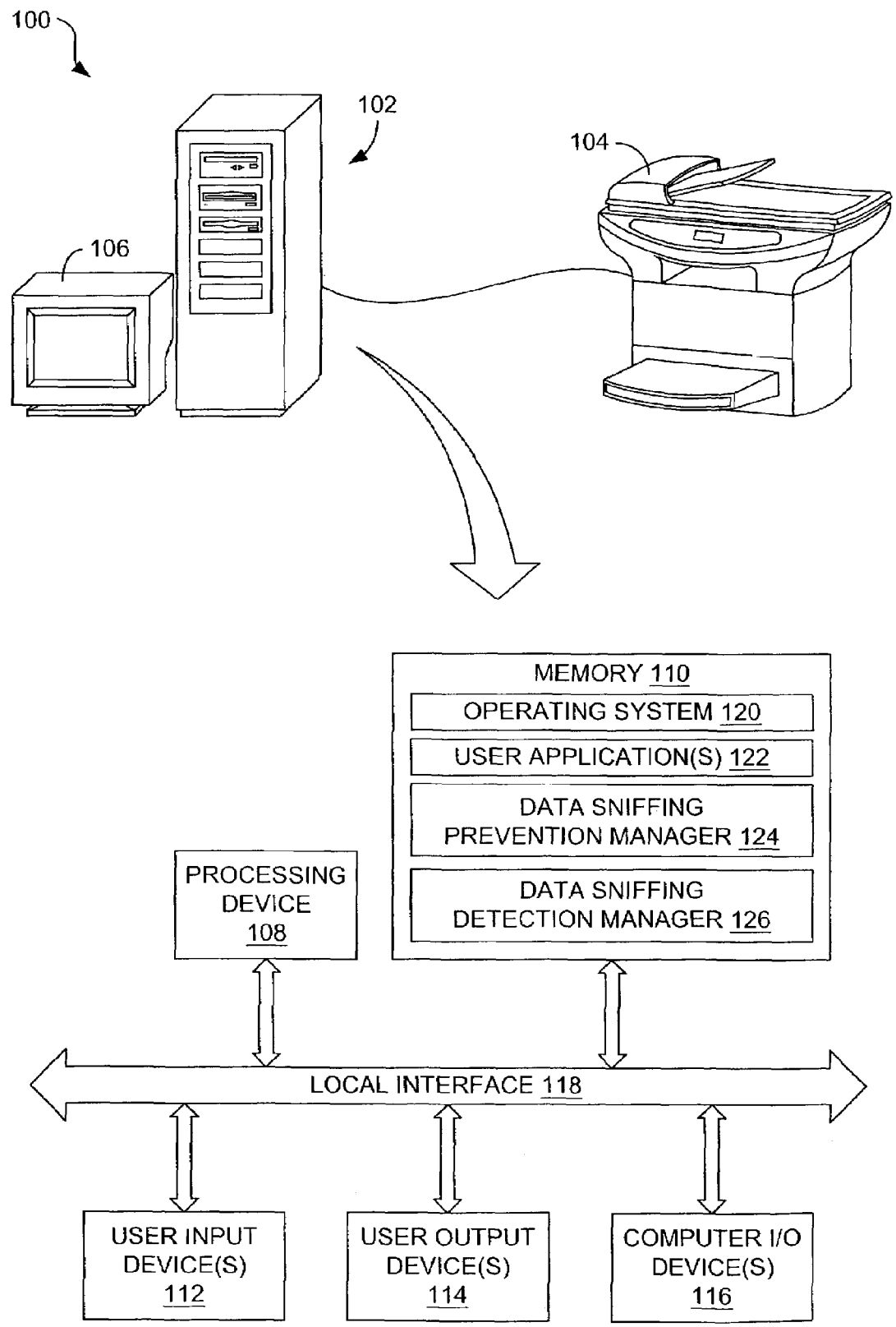
FIG. 1 is a schematic view of an embodiment of a system for increasing the difficulty of data sniffing.

Referring now in more detail to the drawings, in which like numerals indicate corresponding parts throughout the several views, FIG. 1 illustrates an example system 100 one which an unauthorized person may attempt to sniff sensitive information such as usernames, passwords, personal identification numbers (PINs), social security numbers, credit card numbers, and the like. As indicated in FIG. 1, the system 100 generally comprises a computing device 102 and, optionally, may include an independent output device such as an imaging device 104. The computing device 102 can comprise a personal computer (PC). More generally, however, the computing device 102 comprises any device into which a user may enter information whether via a keyboard, mouse, or other user input device. Therefore, by way of example, the computing device 102 can comprise a PC, Macintosh™, notebook computer, server, handheld computing device (e.g., personal digital assistant (PDA), mobile telephone), etc. As is further illustrated in FIG. 1, the computing device 102 may comprise a display 106 that is used to convey visual information to the user.

The imaging device 104 can comprise, for example, a printer. More generally, however, the imaging device 104 comprises any device that is capable of generating hardcopy output of print data transmitted from the computing device 102 and therefore may comprise a photocopier, facsimile machine, multi-function peripheral (MFP) device, etc. Where the imaging device 104 is a shared device, the computing device 102 can, optionally, communicate with the imaging device via network (not shown) that typically may comprise multiple sub-networks that are communicatively coupled to each other. Alternatively, however, the computing device 102 can be directly connected to the imaging device 104.

Also shown in FIG. 1 is an example architecture for the computing device 102. As is depicted in this figure, the computing device 102 comprises a processing device 108, memory 110, one or more user input devices 112, one or more user output devices 114, and one or more computer input/output (I/O) devices 116, each of which is connected to a local interface 118 that comprises one or more internal and/or external buses. The processing device 108 can include any custom made or commercially available processor, a central processing unit (CPU) or an auxiliary processor among several processors associated with the computing device 102, a semiconductor based microprocessor (in the form of a microchip), or a macroprocessor. The memory 110 can include any one of a combination of volatile memory elements (e.g., random access memory (RAM, such as DRAM, SRAM, etc.)) and nonvolatile memory elements (e.g., ROM, hard drive, tape, CDROM, etc.).

The user input devices 112 comprise those components with which the user can enter information into the computing device 102. By way of example, these components comprise a keyboard and mouse. More generally, however, the input devices 112 include any device with which the user can communicate commands or other information to the computing device 102. For instance, in some embodiments the user input devices 112 can include a microphone that is adapted to capture the user's voice commands. Furthermore, where the computing device 102 is a handheld device (e.g., PDA, mobile telephone), these components can comprise function keys or buttons, a touch-sensitive screen, etc.

With further reference to FIG. 1, the user output devices 114 comprise the various devices with which information can be conveyed to the user. Accordingly, these output devices 114 include the display 106. Other output devices 114 may be provided including, for example, one or more speakers through which audible information (e.g., computer-generated voice information) can be provided to the user. As will be apparent from discussions that follow, these user output devices 114 may even include one or more light emitting diodes (LEDs) of the computing device 102, when the LEDs are controlled to signal the user in some manner. As identified above, the imaging device 104 may likewise be considered a user output device 114 in that information, printed on a sheet of media, may be provided to the user.

The computer I/O devices 116 facilitate connection of the computing device 102 to another device, such as the imaging device 104, and may therefore include one or more serial, parallel, small computer system interface (SCSI), universal serial bus (USB), and/or IEEE 1394 (e.g., Firewire™) components.

The memory 110 stores various programs (in software and/or firmware) including an operating system 120, one or more user applications 122, a data sniffing prevention manager 124, and a data sniffing detection manager 126. The operating system 120 controls the execution of other programs and provides scheduling, input-output control, file and data management, memory management, and communication control and related services. The user applications 122 comprise applications that execute on the computing device 102 and which may be used to enter sensitive information (e.g., passwords).

The data sniffing prevention manager 124 is configured to increase the difficulty of data sniffing on the computing device 102. Although the manager 124 is intended to "prevent" data sniffing, it is noted that the manager may not eliminate it altogether. Instead, as noted above and as will be explained in greater detail below, the manager increases the difficulty of sniffing input data to make it more difficult for an unauthorized person to collect data and/or identify sensitive data. In addition, the manager 124 may furthermore facilitate detection of data sniffing by the user. Examples of operation of the data sniffing prevention manager 124 are provided with reference to FIGS. 2-5.

The data sniffing detection manager 126, where provided, may be used to detect when data sniffing is occurring or that it has already occurred. As is discussed below, the detection manager 126 can be configured to detect storage of large amounts of data on the user's hard disk during entry of sensitive information in that such storage may be indicative of data sniffing. An example of operation of the data sniffing detection manager 126 is provided with reference to FIG. 6.

Various programs have been described herein. These programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Example systems having been described above, operation of the systems will now be discussed. In the discussions that follow, flow diagrams are provided. Any process steps or blocks in these flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

As discussed above, identifying sensitive information entered by the user through data sniffing is currently relatively easy to accomplish. Such identification of sensitive information, and therefore the sniffing process, can be made much more difficult, however, when one or more user output devices are used to convey information to the user to provide the user with alternative methods of conveying the sensitive information. First, the amount of data that must be collected may be significantly increased so as to make it difficult and/or impractical for an unauthorized person to collect. Second, where a large amount of data must be collected, identification of sensitive data contained within the collected data becomes more challenging. Third, identification of the sensitive data may further be complicated if the collected data must be correlated, for instance in time, to determine the sought information.

Figure 2:
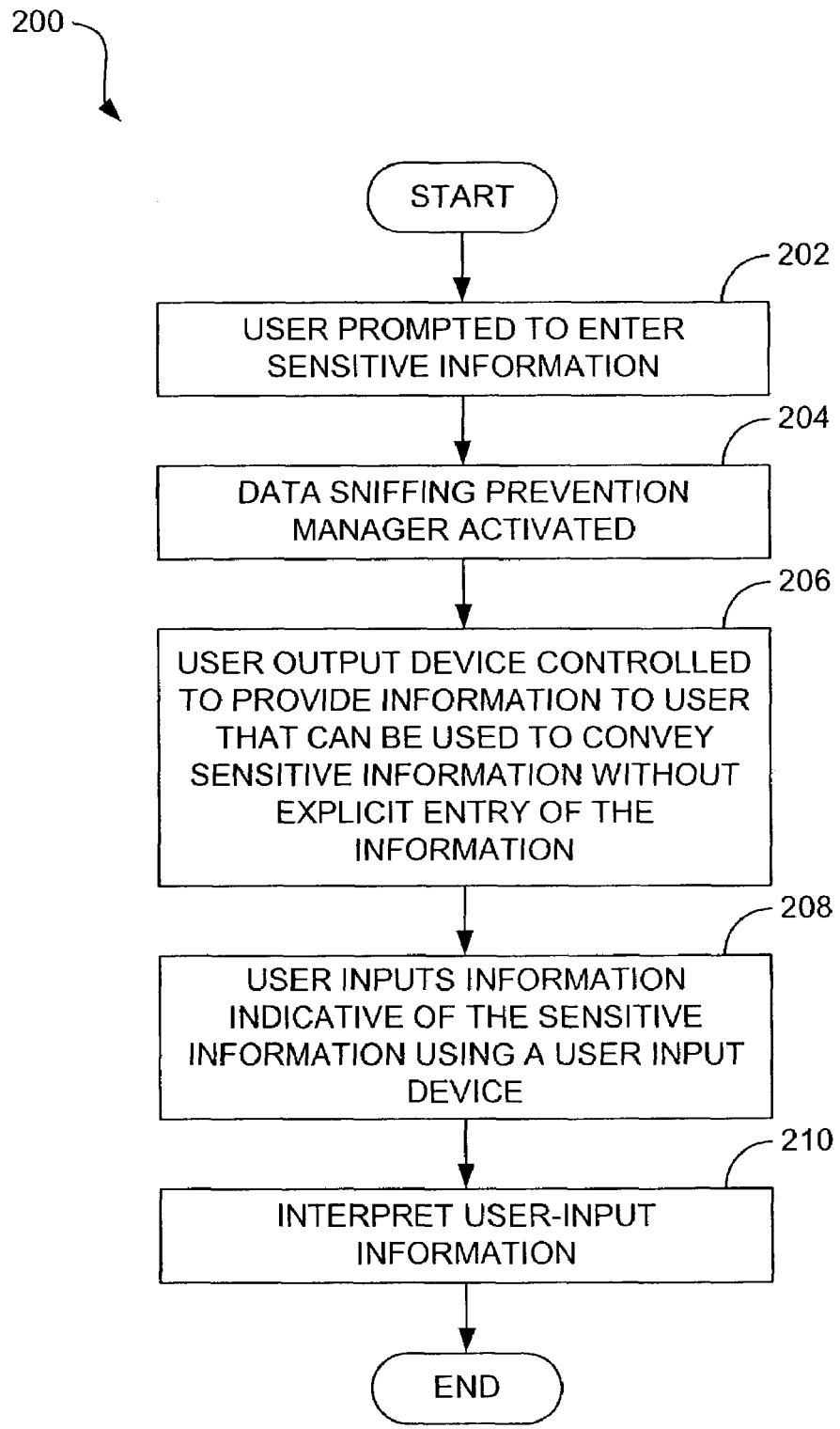
FIG. 2 is a flow diagram that describes an embodiment of use of the system shown in FIG. 1.

A high-level example 200 of operation of the system 100 in increasing the difficulty of data sniffing is provided in FIG. 2. Beginning with block 202, the user is prompted to enter sensitive information into the computing device 102. As identified above, this information may be any information that the user wishes to keep secret such as usernames, passwords, personal identification numbers (PINs), social security numbers, credit card numbers, and the like. By way of example, the user may be prompted upon arriving at a login screen used to access his or her computing device or upon arriving at a secure screen of a Web site. In any case, the data sniffing prevention manager 124 is activated, as indicated in block 204.

Upon activation, the data sniffing prevention manager 124 controls a user output device 114 to provide information to the user that the user can use to convey the sensitive information without explicitly entering the information, as indicated in block 206. In other words, information is presented to the user that corresponds to various characters available for identification as part of the sensitive information (e.g., password) so that the user can convey the sensitive information without literally entering the characters of the information. For example, where a password to be entered is the term "table," the user is provided with information that permits the user to identify this term to the computing device 102 without tapping "t-a-b-l-e" on the keyboard. The nature of the information provided to the user can take many different forms. As is described in greater detail below, the information can comprise visual information presented in the display 106, printed information generated by the imaging device 104, audible information generated by computing device speakers, or some other form of information.

Once this information is provided to the user, regardless of its form, the user may then input information indicative of the sensitive information using a user input device 112, as indicated in block 208. When this information is input by the user, the information is interpreted by the data sniffing prevention manager 124, as indicated in block 210, so that it may be used for the purpose for which it was requested (e.g., to determine the user's authorization to access other information).

The operation of the system 100 can best be understood with reference to specific examples. Therefore, various examples of operation of the data sniffing prevention manager 124 are provided with reference to FIGS. 3-6 to provide the reader with an understanding of how a user output device can be used to permit the user to convey sensitive information without literally entering it using a keyboard. Although particular examples are provided, these examples are merely illustrative of how an output device can be used to increase the difficult of data sniffing and are not intended to limit the scope of this disclosure.

Figure 3:
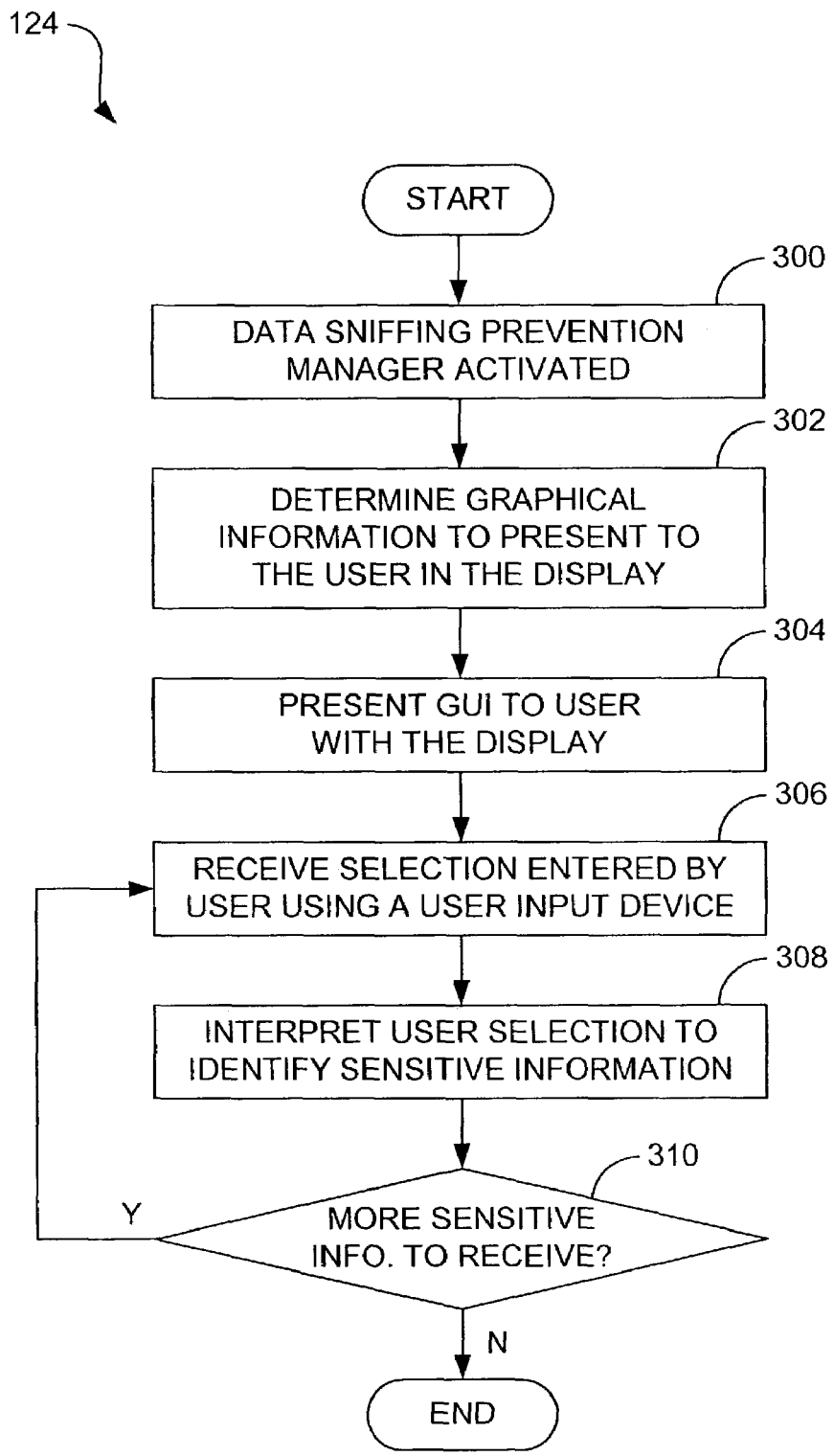
FIG. 3 is a flow diagram that illustrates a first embodiment of operation of the data sniffing prevention manager shown in FIG. 1.

FIG. 3 provides an example of operation of the data sniffing prevention manager 124 in utilizing the display 106 to provide information to a user that the user can use to convey sensitive information. Beginning with block 300 of this figure, the data sniffing prevention manager 124 is activated. As noted above with reference to FIG. 2, this activation may occur, for example, upon the user being prompted to enter sensitive information. Therefore, activation may occur when the data sniffing prevention manager 124 detects a log in screen or pop-up box that requires entry of sensitive information being presented to the user, or the arrival of the user at a given page of a Web site. To facilitate such detection, each screen, pop-up box, or Web page at which the user will need to provide sensitive information can be tagged so as to invoke the data sniffing prevention manager 124. Alternatively, however, the data sniffing prevention manager 124 may be manually activated by the user whenever the user discovers that sensitive information is requested.

Regardless of the manner in which the data sniffing prevention manager 124 is activated, the manager next determines what graphical information to present to the user, as indicated in block 302 and, at block 304, presents a graphical user interface (GUI) to the user with the display 106. Once this GUI is presented, the data sniffing prevention manager 124 receives a selection entered by the user using a user input device 112, as indicated in block 306. The nature of the GUI presented to the user may take many different forms as can the selection entered by the user. Generally speaking, however, presented is various graphical information that is in some way associated with the various characters of the sensitive information (e.g., password) the user would like to enter. Through presentation of this graphical information, the user may enter characters other than those of the actual characters of the sensitive information to increase the difficulty of sniffing the sensitive information.

Figure 4:
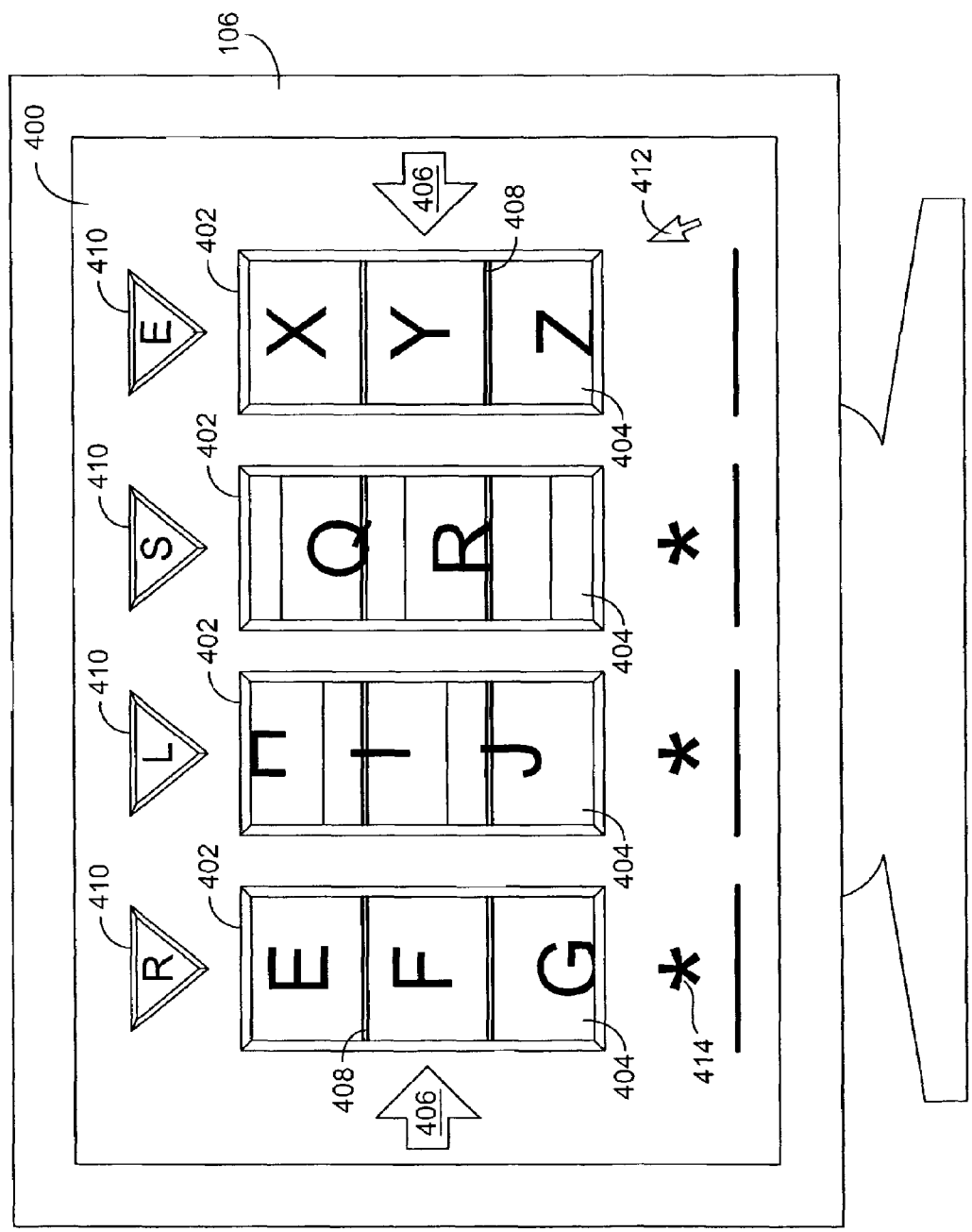
FIG. 4 is a schematic view of a display shown in FIG. 1 presenting an embodiment of a graphical user interface that may be used to increase the difficulty of keyboard sniffing.

An example GUI 400 is illustrated in FIG. 4. In particular, illustrated is a "slot machine" GUI that may be used to identify the various characters of a password or other string of characters. In this example, it is assumed that a four letter password or other character string is to be entered by the user. As indicated in FIG. 4, the GUI 400 comprises four different windows 402 that each "houses" a virtual wheel 404 upon which the letters of the alphabet (and/or numerals 0-9) are provided. Each of the wheels 404 slowly rotates within its window 402 such that the various letters of the alphabet provided on each wheel is scrolled before the user for possible selection. In particular, each of the letters is scrolled so that it ultimately aligns with a selection zone identified with indictors 406 and defined by horizontal bars 408. Further provided in the GUI 400 are window indicators 410 that associate a given letter of the alphabet with each window 402.

With the GUI 400 illustrated in FIG. 4, the user can identify the various characters of the password or other character string to be entered by "selecting" the desired character within each window 402 of the GUI when that character is positioned within the selection zone. In one arrangement, this selection is effected by depressing on the keyboard the key the letter contained in the indicator 410 associated with a given window 402 when the desired letter is contained within the associated with selection zone of that window. In the instance shown in FIG. 4, for example, the letter "F" may be selected as the first character of the password or other character string by depressing the "R" key in that "F" is displayed in the selection zone of the window 402 associated with the "R" indicator 410. In another arrangement, the cursor 412 may be used to selected the "R" indicator 410 by positioning the cursor over this indicator with a mouse and "clicking" a mouse button. In still another arrangement, the selection may be conveyed by the user by speaking "R" into a microphone of the computing device 102. The above-described processes, or processes like them, may be used to select each character of the password or other character string. An entered selection may be identified to the user by, for example, presenting an asterisk 414 in a blank associated with each window 402.

With reference back to FIG. 3, once a selection is received it is interpreted to identify the sensitive information it represents, as indicated in block 308. In keeping with the above-provided example, receipt of an "R" entered by the user on the keyboard at a point in time when "F" is displayed in the selection zone of the left-most window 402 is interpreted as entry of an "F". Referring next to decision block 310, the data sniffing prevention manager 124 determines whether more sensitive information is to be received. For instance, it is determined whether all four characters have been selected by the user using one of the methods described above. If so, all sensitive information has been received and interpreted, and flow for the data sniffing prevention manager 124 is terminated. If not, however, flow returns to block 306 and the GUI is continued to be used to facilitate selection of the remaining sensitive information.

Using the method described above with reference to FIGS. 3 and 4, the user does not actually enter the literal characters of the sensitive information, at least not in the correct order. Accordingly, identification of the sensitive information by conventional keyboard sniffing is not possible. Instead, the sensitive information can only be determined by identifying the user's keyboard entries in relationship with the graphical information presented in the GUI. Therefore, in addition to recording all keystrokes made by the user, the unauthorized person must further record all graphical information presented in the GUI. Accordingly, the amount of data that must be stored is increased by several orders of magnitude in that substantially all data sent to the computing device video hardware (e.g., video card) must be stored. This amount of data may be even further increased where the user makes selections using a mouse or through audible command in that additional data (mouse clicks all captured audio data) must also be collected and analyzed. Furthermore, the unauthorized person must also identify the time each keystroke, mouse click, or audible command was made and then correlate it to the graphical information presented at that time. Although this may be accomplished by assigning a time stamp to each input event and each piece of information presented in the GUI and then correlating the two, this further adds to the amount of data that must be recorded and stored. Where the data is recorded on an external device, the device may be quickly overcome with data due to the great amount of data associated with the presentation of graphical information. Where the data is being recorded on the user's hard disk, the amount of available disk space will be quickly used. Given the rapidity with which this disk space is used, the data sniffing may be easily identified by the user, particularly where the computing device 102 is configured to detect data sniffing (see FIG. 6).

Many variations on the GUI, and therefore the graphical information, provided to the user can be implemented. For instance, instead of a slot machine GUI, a roulette wheel GUI could be used in which the various selectable characters are contained in a slowly spinning virtual roulette wheel. In such a case, characters aligned with a given pointer can be selected by, for instance, tapping the space bar of the keyboard, clicking with a mouse, or speaking an audible command. In another alternative, the various characters available for selection may be presented in a number of floating boxes of the GUI and selections entered by "clicking" on the desired characters using the mouse or by simply "following" a given box for a predetermined amount of time (e.g., a few seconds) with the onscreen cursor. Optionally, the characters to be selected may be represented graphically as opposed to being presented in a known font (e.g., Times Roman™) to further increase the amount of data that must be collected. For instance, the characters can be identified with a pattern of objects such as circles or squares with the objects that form a given character being a different color than like-sized and shaped objects in the background. In yet another variation, the graphical information presented in the GUI may not even comprise the alphanumeric characters that are to be identified. For instance, each piece of graphical information may comprise a photograph or other image of a thing that the user associates with the character to be selected. To cite an example, a photograph of an apple can be provided for selection to represent the letter "A." In such a scenario, the amount of graphical data that must be stored is further increased in that such images typically comprise more data than a simple graphic of a character (e.g., in a known font).

Figure 5:
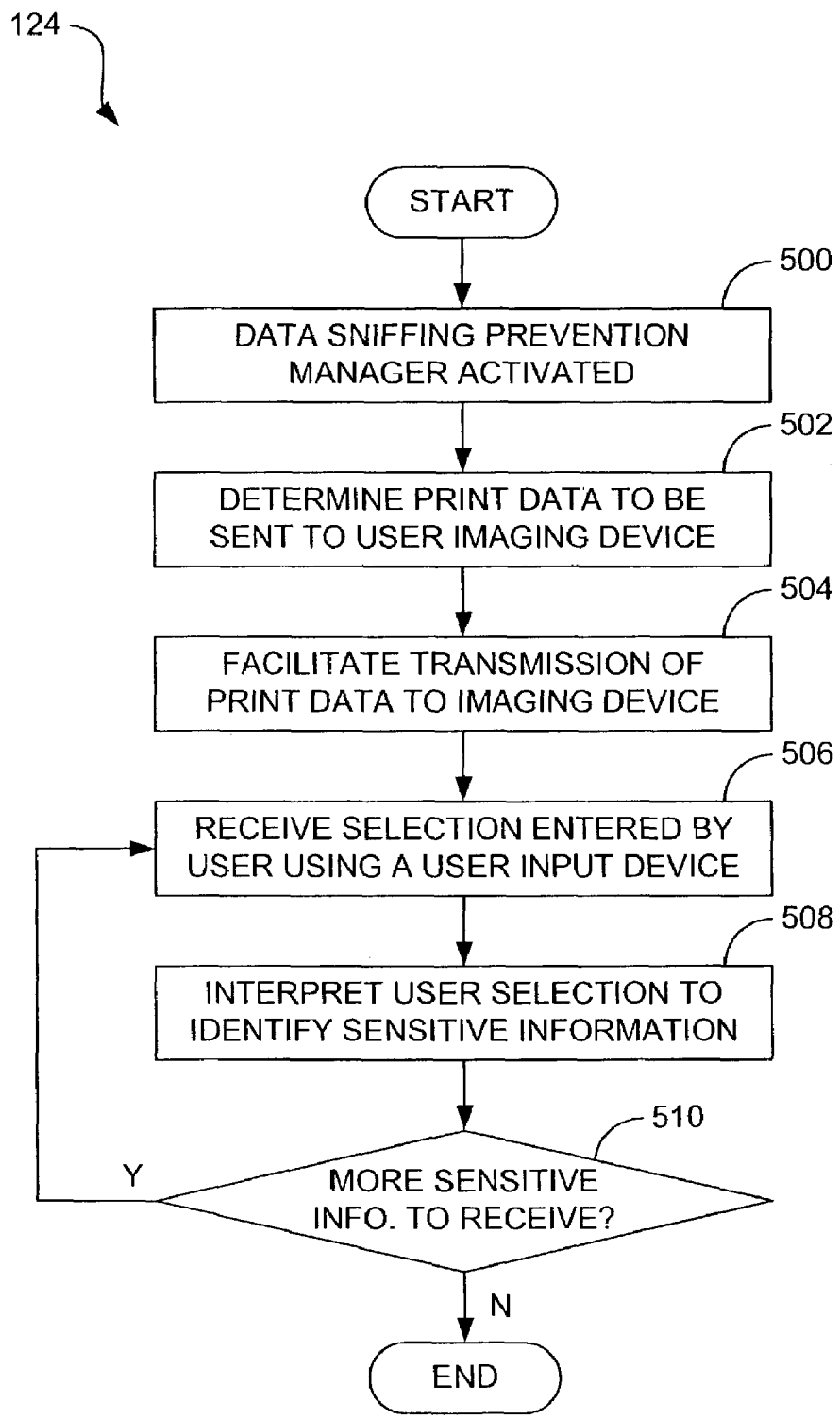
FIG. 5 is a flow diagram that illustrates a second embodiment of operation of the data sniffing prevention manager shown in FIG. 1.

FIG. 5 provides an example of operation of the data sniffing prevention manager 124 in which a user output device other than the display is used to provide information to the user that may be used to convey sensitive information. In particular, FIG. 5 provides an example in which the imaging device 104 is used to provide this information to the user. Beginning with block 500, the data sniffing prevention manager 124 is activated. Again, this activation may occur upon the user being prompted to enter sensitive information or when requested manually by the user. Once activated, the data sniffing prevention manager 124 determines what print data is to be sent to the imaging device 104, as indicated in block 502. The print data may, for example, comprise a simple cipher that is used to correlate various keyboard characters with characters that the user would like to enter. For instance, the print data may comprise a random association of letters in which, "E" signifies a "P," "X" signifies a "T," and so forth. Optionally, the print data may be newly generated by an appropriate algorithm of the data sniffing prevention manager 124 each time the user is to enter sensitive data or on a periodic basis (e.g., every hour) to make it more difficult to identify the relationship between the entered characters and the actual characters of the sensitive information.

After the print data to be sent has been determined, the data sniffing prevention manager 124 facilitates transmission of the print data to the imaging device 104, as indicated in block 504, for instance by providing the data to a driver associated with the imaging device. The user can then pick up a hardcopy printout containing the print data and, with reference to the character associations contained therein, determine what characters are to be selected using the keyboard or other user input device 112 (e.g., mouse, microphone).

Once a selection is received, as indicated in block 506, it is interpreted to identify the sensitive information it represents, as indicated in block 508. In particular, using the same cipher used by the user to enter a selection, the data sniffing prevention manager 214 determines what character the user intends to convey based upon the character that has been entered. Referring next to decision block 510, the data sniffing prevention manager 124 determines whether more sensitive information is to be received. If so, all sensitive information has been received and interpreted, and flow for the session is terminated. If not, however, flow returns to block 504 and further selections made by the user are received and interpreted.

As with the method of FIGS. 3 and 4, the method of FIG. 5 enables the user to convey the sensitive information without actually entering the various characters that comprise the sensitive information. Therefore, identification of the sensitive information is made more difficult. In particular, an unauthorized person must not only record the information entered by the user using the input device but must also record the print data that has been sent to the imaging device 104. Where this print data comprises graphical representations of the various characters other than in known fonts (e.g., with photographic images), the amount of data that must be stored increases substantially. Again, this amount of data may be even further increased where the user makes selections with a mouse or audibly. Furthermore, the unauthorized person must also correlate the print data with the user selections to ensure that the selections are associated with the correct characters.

In FIGS. 3-5, two different user output devices are described as being used to provide information to the user. Various other output devices could be used for this purpose. For instance, the speakers of the computing device could audibly provide the information contained in the print data in FIG. 5. In such a case, a "voice" could instruct the user to "enter C for T, enter Q for U . . . ". In another example, LEDs provided on the computing device "box" could be used to signal the user as to how or when to make an entry. Accordingly, nearly any device or component capable of providing information to a user could be used to enable the user to increase the difficulty of data sniffing.

Figure 6:
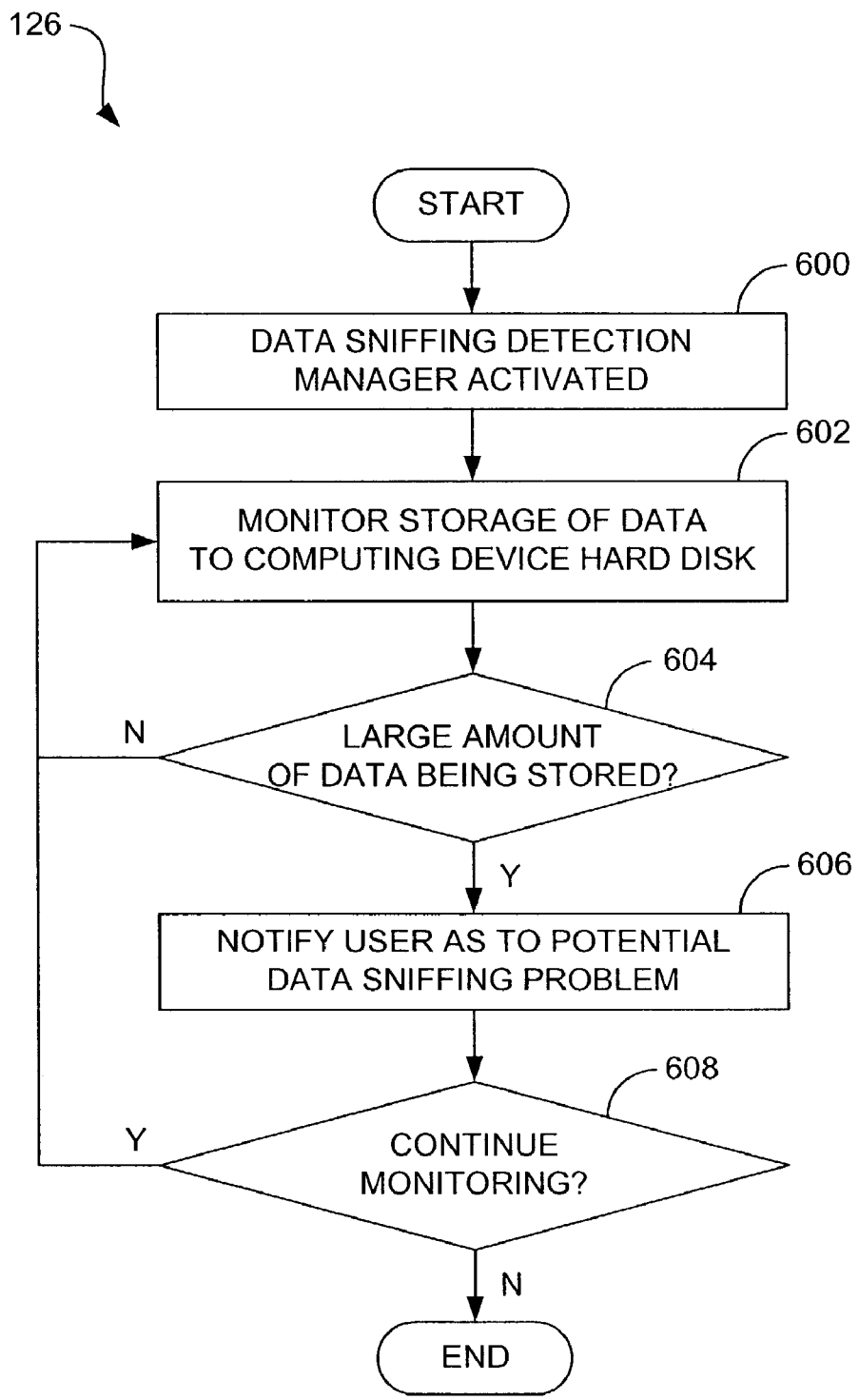
FIG. 6 is a flow diagram that illustrates an embodiment of operation of the data sniffing detection manager shown in FIG. 1.

FIG. 6 provides an example of operation of the data sniffing detection manager 126. This manager 126 can be used to notify the user when it is determined that large amounts of data are being stored on the computing device hard disk. More particularly, the manager 126 can be used to determine when such data is being stored simultaneously to entry of sensitive information. When used in conjunction with the data sniffing prevention manager 124, identification of data sniffing may be facilitated in that relatively large amounts of data may be stored to the hard disk, particularly during entry of sensitive information. Beginning with block 600, the data sniffing detection manager 126 is activated.

This activation may occur upon the user being prompted to enter sensitive information or when requested manually by the user in the same manner as activation of the data sniffing prevention manager 124. Alternatively, however, the data sniffing detection manager 126 may always be working the in background of the computing device 102. In a further alternative, the data sniffing prevention manager 126 can be activated upon activation of the data sniffing prevention manager 124.

Once the data sniffing detection manager 126 is activated, it monitors the storing of data to the hard disk, as indicated in block 602, to determine if large amounts of data are being stored to the hard disk, for instance on an ongoing basis over the course of several seconds. Such storage of data may indicate the presence of a data sniffing program executing on the computing device 102, particularly where this storage occurs during entry of sensitive information with the data sniffing prevention manger 124 operating. Next, with reference to block 604, the data sniffing detection manager 126 determines whether a large amount of data is being stored to the hard disk. If not, presumably no internal data sniffing is occurring and flow may return to block 602. If a large amount of data is being stored to the hard disk, however, particularly during entry of sensitive data, data sniffing may be occurring and the user is notified as to this possibility, as indicated in block 606.

At this point, the data sniffing detection manager 126 determines whether to continue monitoring storage of data to the hard disk, as indicated in decision block 608. This determination may hinge upon, for instance, whether sensitive information is still being entered or whether the data sniffing prevention manager 124 is still executing. If monitoring is to continue, flow returns to block 602. If not, however, flow for the session is terminated.

What is claimed is:

1. A method for increasing the difficulty of data sniffing, comprising:
   prompting a user with a computer to input sensitive information into the computer;
   identifying to the user with the computer first characters available for input by the user and second characters that the first characters signify, each of the first characters signifying one of the second characters;
   explicitly identifying to the user with the computer the relationship between the first and second characters so as to explicitly indicate to the user the second character that each first character signifies;
   receiving with the computer from user keystrokes entered with a physical keyboard input of selected first characters that signify second characters that comprise part of sensitive information of the user; and
   interpreting the input first characters to determine the sensitive information that the input first characters signify such that the user can convey the sensitive information without actually entering the characters of that information so that the sensitive information cannot be captured through collection of the user's keystrokes alone.

2. The method of claim 1, wherein identifying first and second characters comprises presenting a graphical user interface to the user via a display, the graphical user interface associating the first characters with the second characters.

3. The method of claim 1, wherein identifying first and second characters comprises causing a cipher that associates the first characters with the second characters to be printed as a hard copy document that the user can use as a guide as to which first characters signify which second characters.

4. The method of claim 1, wherein identifying first and second characters comprises audibly providing to a user via a speaker a cipher that associates the first characters with the second characters and that the user can use as a guide as to which first characters signify which second characters.

5. A data sniffing prevention manager stored on a computer-readable medium, comprising:

> logic configured to identify first characters available for input by the user and second characters that the first characters signify, each of the first characters signifying one of the second characters;
>
> logic configured to explicitly identify the relationship between the first and second characters to the user so as to explicitly indicate to the user the second character that each first character signifies;
>
> logic configured to receive user keystrokes entered with a physical keyboard input of selected first characters that signify second characters that comprise part of sensitive information of the user; and
>
> logic configured to interpret the input first characters to determine the sensitive information that the input first characters signify such that the user can convey the sensitive information without actually entering the characters of that information so that the sensitive information cannot be captured through collection of the user's keystrokes alone.

6. The manager of claim 5, wherein the logic configured to identify first and second characters comprises logic configured to facilitate display of a graphical user interface that associates the first characters with the second characters.

7. The manager of claim 5, wherein the logic configured to identify first and second characters comprises logic configured to cause a cipher that associates the first characters with the second characters to be printed as a hard copy document that the user can use as a guide as to which first characters signify which second characters.

8. The manager of claim 5, wherein the logic configured to identify first and second characters comprises logic configured to audibly provide to a user a cipher that associates the first characters with the second characters and that the user can use as a guide as to which first characters signify which second characters.

9. A system for increasing the difficulty of data sniffing, comprising:

> means for identifying first characters available for input by the user and second characters that the first characters signify, each of the first characters signifying one of the second characters;
>
> means for explicitly identifying the relationship between the first and second characters to the user so as to explicitly indicate to the user the second character that each first character signifies;
>
> means for receiving user keystrokes entered with a physical keyboard input of selected first characters that signify second characters that comprise part of sensitive information of the user; and
>
> means for interpreting the input first characters to determine the sensitive information that the input first characters signify such that the user can convey the sensitive information without actually entering the characters of that information so that the sensitive information cannot be captured through collection of the user's keystrokes alone.

10. The system of claim 9, wherein the means for identifying first and second characters comprise a display.

11. The system of claim 9, wherein the means for identifying first and second characters comprise printer.

12. The system of claim 9, wherein the means for providing information identifying first and second characters comprise a speaker.

\* \* \* \* \*

UNITED STATES PATENT AND TRADEMARK OFFICE
CERTIFICATE OF CORRECTION

PATENT NO. : 7,370,209 B2  Page 1 of 1
APPLICATION NO. : 10/354759
DATED : May 6, 2008
INVENTOR(S) : Blaine Douglas Gaither It is certified that error appears in the above-identified patent and that said Letters Patent is hereby corrected as shown below:

In column 12, lines 32-33, in Claim 12, after "means for" delete "providing information".

Signed and Sealed this

Twenty-ninth Day of July, 2008

JON W. DUDAS
*Director of the United States Patent and Trademark Office*